Sept. 11, 1956 B. D. IRVIN 2,762,632
INDEPENDENT FRONT WHEEL SUSPENSION
Filed June 23, 1953 3 Sheets-Sheet 2
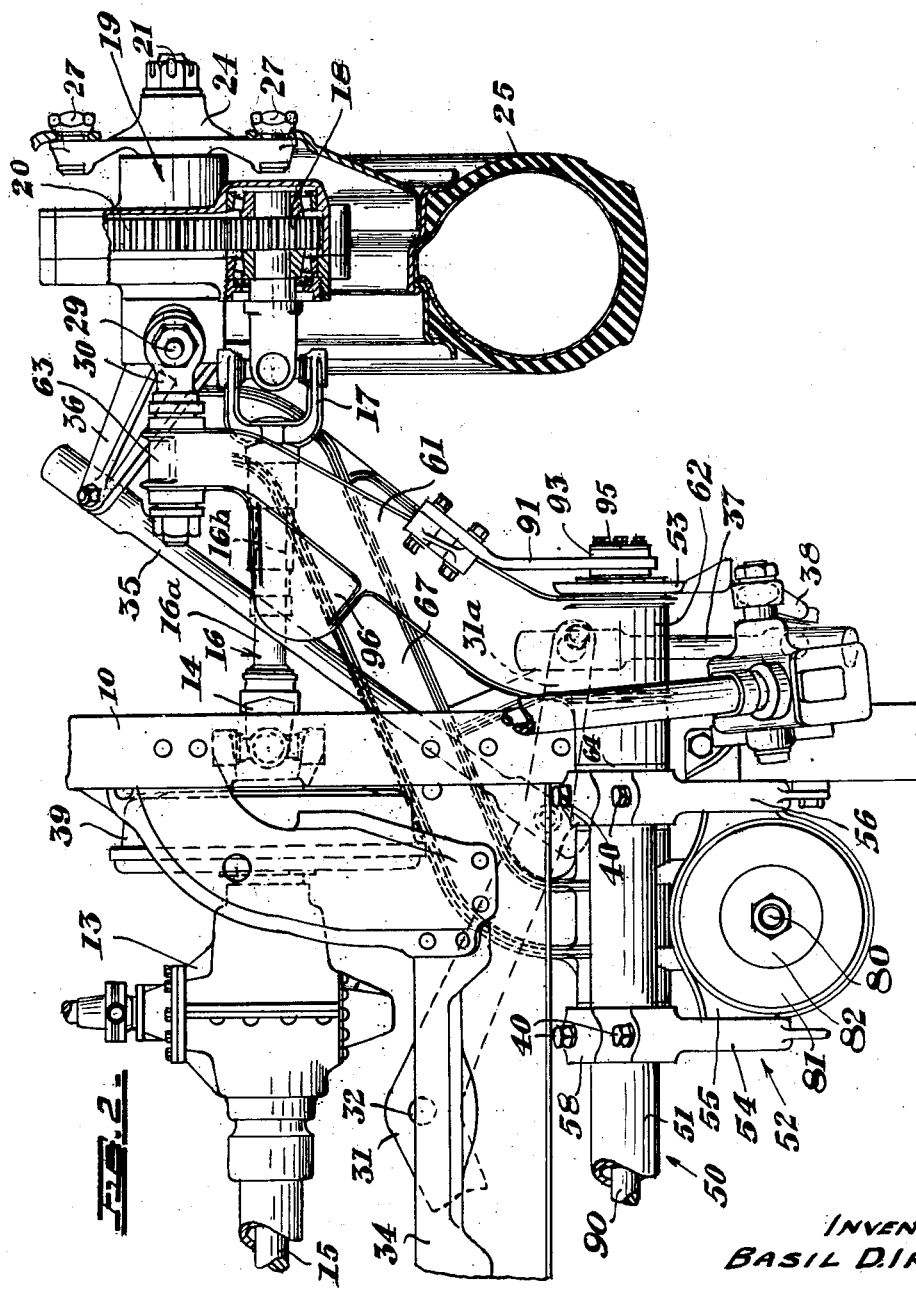
INVENTOR
BASIL D. IRVIN
By Smart & Biggar
ATTORNEYS.

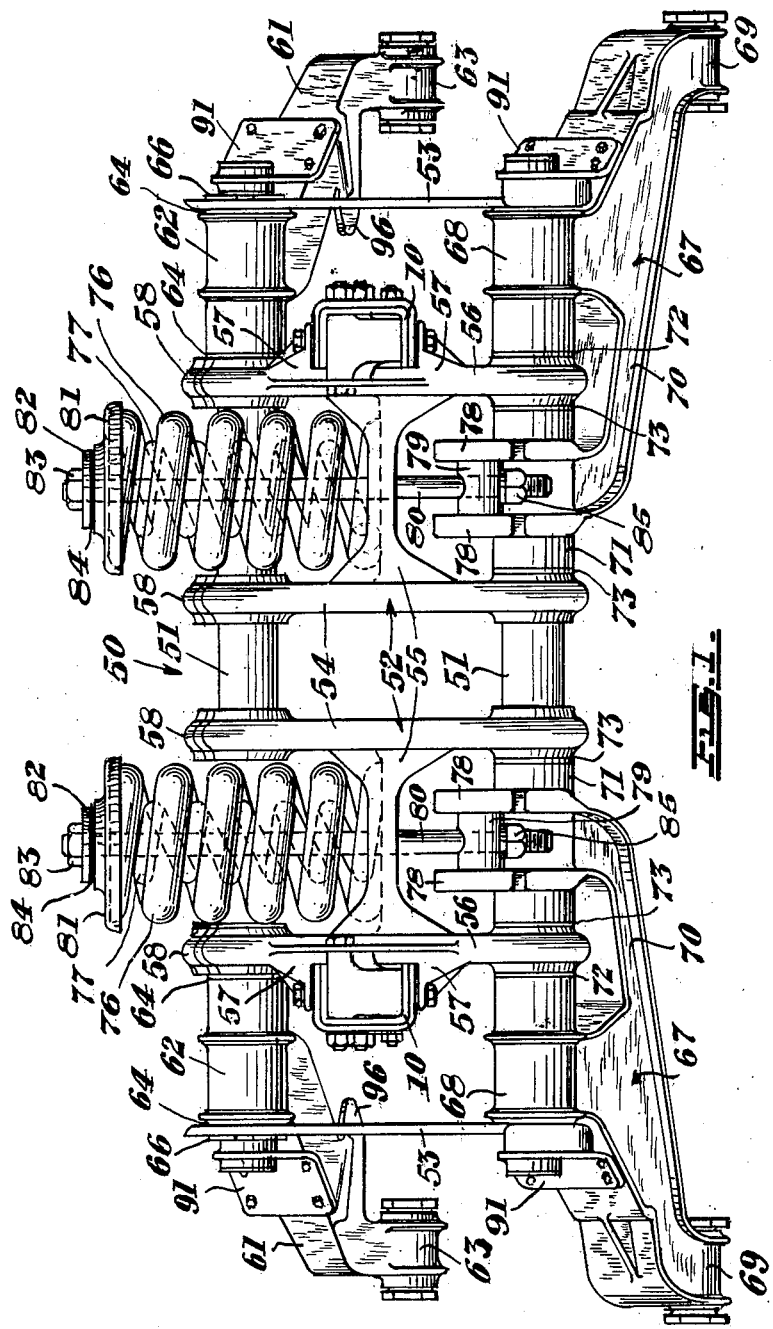

Sept. 11, 1956  B. D. IRVIN  2,762,632
INDEPENDENT FRONT WHEEL SUSPENSION
Filed June 23, 1953  3 Sheets-Sheet 3
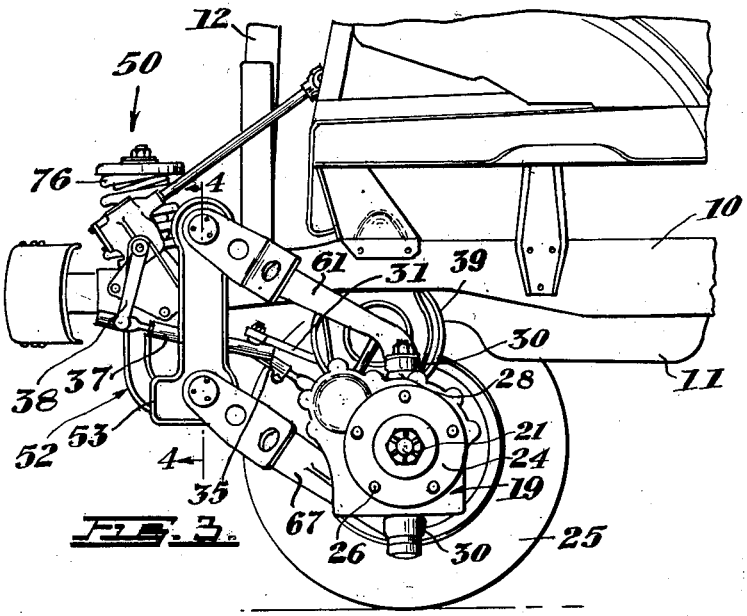
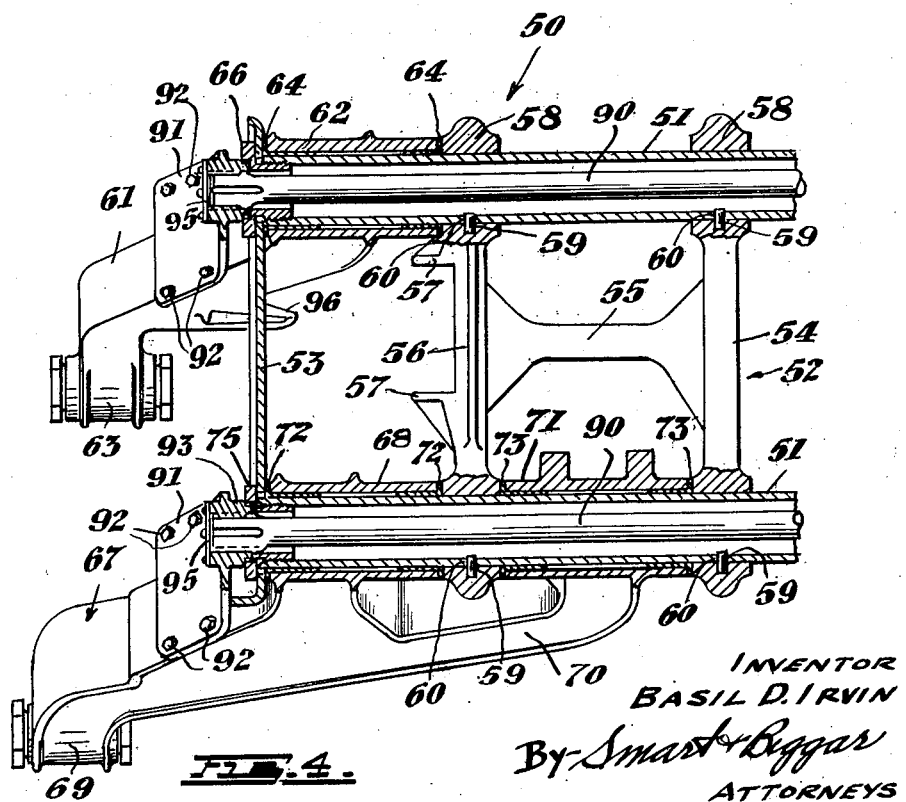
INVENTOR
BASIL D. IRVIN
By Smart & Biggar
ATTORNEYS

United States Patent Office 2,762,632
Patented Sept. 11, 1956

2,762,632

INDEPENDENT FRONT WHEEL SUSPENSION

Basil D. Irvin, Ottawa, Ontario, Canada

Application June 23, 1953, Serial No. 363,572

Claims priority, application Canada June 23, 1952

2 Claims. (Cl. 280—96.2)

This invention relates to the conversion of normal front engine commercial vehicles in order to make them suitable for a large percentage of off the road uses, particularly military uses.

As is well known, it is necessary for a military vehicle for example to be able to leave the road at any time and to traverse ground which may be extremely rough. To this end it has been considered necessary to provide a very much stronger and more rugged vehicle for such purposes than for a commercial vehicle of corresponding capacity, with the result that such vehicles, particularly military vehicles, have been very much more expensive than normal commercial vehicles, and, because they have required special design and special manufacture involving special tooling, their ready supply in adequate numbers has proved a very serious as well as expensive problem. Furthermore such vehicles, as a result, have proven to be much heavier than is desirable.

The object of the present invention is to provide independent front wheel suspension mechanism for existing commercial vehicles (by which is meant, ones having longitudinal frame members of insufficient torsional strength to carry independent suspension, and having the engine placed at the front, between the longitudinal frame members and substantially astride the front wheel axle position), particularly ones provided with front wheel drive, such as to permit them to negotiate rough ground without subjecting the existing structure of the commercial vehicle to unacceptable shocks, jars, stresses and strains, the mounting and actuation of the spring means as well as of the trailing suspension arms permitting the adaptation of existing commercial vehicles.

Further features of the invention will appear from the accompanying claims and from the following description of an embodiment of the invention illustrated in the accompanying drawings in which:

Figure 1 is an enlarged front elevation of the suspension system according to the invention, Figure 2 is an enlarged top plan view of one side of a vehicle of the type described modified according to the invention, the wheel and tire being broken away to show the wheel drive gear housing, Figure 3 is a side elevation of the front portion of the vehicle illustrated in Figure 2 with the left front wheel removed, and Figure 4 is a detailed view of the right side of the suspension system illustrating the mounting of the trailing arms and their connection to the torsion bars.

The vehicle illustrated in Figures 2 and 3, is as indicated above, a rear drive commercial vehicle having longitudinal frame members 10 of insufficient torsional strength to carry independent wheel suspension and having the engine 11 placed at the front between the longitudinal frame members 10 and substantially astride the normal front wheel axle position with the radiator 12 ahead of such front wheel axle position. As illustrated in Figure 3 the conventional axle unit, spring suspension members and steering units have been removed. For convenience in illustration the conventional cowling and fenders are not shown. Because of the fact that the engine is positioned substantially astride the normal front axle position there is insufficient room to permit the mounting of a differential for the driving of the front wheels in such manner as to allow the differential to move up and down in accordance with the wheel movement. The differential 13 illustrated in Figure 2 is rigidly secured to the longitudinal frame members 10 by means which, to avoid complication of the drawings, are not shown. A universal joint 14 is connected to the end of each shaft 15 of the differential 13 and is also connected to a shaft 16 which is extensible and has connected to the other end a universal joint 17 connected to drive a spur gear 18 mounted in a wheel drive gear housing 19. The shaft 16 is extensible to provide for its lengthening and shortening on up and down movement of the wheel and on pivoting of the wheel. The shaft 16 is thus formed in two portions, one of which, 16a is externally splined to cooperate with an internally splined sleeve with which the other portion 16b is provided.

As illustrated in Figure 2, the wheel drive gear housing 19 has mounted therein a gear 20 rigidly mounted on a stub shaft 21. Gear 20 is driven by spur gear 18 which as appears from Figure 2 is offset (to the front) so that the shaft 16 and joint 17 clear the suspension and steering members. Thus a suitable reduction in speed is obtained at the wheel whereby the differential 13 need provide only for part of the necessary speed reduction, and therefore may be small enough to be fitted, as illustrated in Figure 3, in the relatively small space available having regard to the position of the vehicle engine, and the shaft 16 and joints 14 and 17 do not carry the full torque applied to the wheels and may be reduced in size accordingly. A wheel hub 24 is suitably mounted on the stub shaft 21, and wheel 25 is mounted on the hub 24 by bolts 26 and nuts 27.

The housing 19 is mounted by means of integral sleeve 28, on king pin 29 at each end of which is pivotally mounted an eyed yoke pin 30 for the purpose referred to below. The steering of the wheels involving pivoting of housing 19 on the king pin 29 is effected as follows: A yoke lever 31 illustrated in Figure 2 is pivotally mounted at 32 in a bracket, not shown, secured to a cross frame member 34. Each arm of the yoke lever 31 is connected in known manner to a tie rod 35, the other end of which is pivotally connected in the usual manner to an arm 36 fixedly connected to housing 19. The left-hand end of the yoke lever 31 is provided with an extension 31a to which is pivotally connected a tie rod 37 having its other end connected to the pitman arm 38 of the conventional steering box of the vehicle. It is important to note with reference to Figures 2 and 3 that the tie rods 35 are, in side elevation, substantially parallel and equal in length to the trailing arms referred to below.

As illustrated in Figure 2, the brakes for the front wheels are mounted inside the universal joints 14 to act on the shafts 15, the brake drums 39 being secured to the longitudinal frame members 10.

There will now be described with particular reference to Figures 1 and 2, the independent front wheel suspension system according to the invention which in combination with the front wheel drive and steering arrangement described above makes it possible to convert the commercial vehicle of the type described, into one having front wheel drive and having suitable ride characteristics while maintaining satisfactory road clearance. A transverse reinforcing unit 50 is connected to the two longitudinal frame members 10 well in front of both the engine and the radiator of the vehicle. The reinforcing unit 50 comprises a pair of vertically spaced tubular frame reinforcing members 51 securely connected to each other by a pair of trusses 52 and by a pair of supporting plates 53. Each truss 52 comprises a vertically extending strut 54 connected by web 55 to a vertically extending strut 56 formed with a U-shaped lateral extension 57 adapted to fit over and be bolted to the adjacent longitudinal frame member.

Each of the struts 54 and 56 is bored at the top end and at the bottom end so as to fit over a tubular member 51, and each end of each of the struts 54 and 56 is split to provide a removable cap secured by suitable means. The top caps 58 secured by screws 40 are seen in Figure 2. In order to prevent movement of the trusses 52 longitudinally of the tubular members 51, each end of each strut is provided as shown in Figure 4 with a pin or dowel 59 adapted to engage in a hole 60 formed in the wall of the tubular member 51.

At each end of the top frame reinforcing member 51 there is pivotally mounted a trailing arm 61 which is an arm projecting rearwardly from the tubular member as indicated in Figures 2 and 3 and provided at the front end with a bearing sleeve 62 pivotally mounted on the tubular member 51, and at the other with a bearing sleeve 63 pivotally mounted on a pin 30 which is pivotally connected to the top end of king pin 29. As shown in Figure 4, a bushing 64 is positioned between the bearing sleeve 62 and the adjacent strut 56, and between sleeve 62 and the tube 51, and a corresponding bushing 64 is provided at the outer end of sleeve 62. The supporting plate 53 and the bearing sleeve 62 are secured in position by a nut 66 engaging an internally threaded portion of the tubular member 51 in the manner shown in Figure 4.

At each end of the lower tubular member 51 there is a trailing arm 67 which is provided with a corresponding bearing sleeve 68 pivotally mounted on the lower tubular member 51, and provided at the trailing end with a bearing sleeve 69 pivotally mounted on a pin 30 pivotally connected to the lower end of the king pin 29. As appears from Figures 2 and 3, the trailing arms 61 and 67 are of great length in view of the positioning of the frame reinforcing members ahead of the engine and radiator. In the embodiment illustrated the arms are of an effective length (i. e. a length measured parallel to the length of the vehicle) substantially equal to the radius of a wheel, and being of at least this length, are braced, at least at the bottom. Thus the lower trailing arm 67 is provided with a strut 70 formed as an integral part thereof and extending from a point near the trailing end of the arm to the lower frame reinforcing member 51 on which it is pivotally mounted by means of a bearing sleeve 71. The sleeve 71 is spaced inwardly from the sleeve 68 with a strut 56 positioned therebetween. The sleeve 68 is provided with bushings 72 corresponding to bushings 64, and sleeve 71 is likewise provided with bushings 73. As shown in Figure 4, the supporting plate 53 and the arm 67 are held in position on the lower tubular member by nut 75 engaging an internally threaded portion of the tubular member 51.

The spring means resisting upward pivoting of the trailing arms 61 and 67 consists in the embodiment illustrated of an outer coil spring 76 and an inner coil spring 77, the latter mounted within the former and both resting on the web 55 of each truss 52.

As illustrated in Figures 1 and 2, each bearing sleeve 71 is provided with two forwardly projecting arms 78 in which is journalled a pin 79 bored to pass a rod 80 extending upwardly through the web 55 and inside the two springs 76 and 77 and through a cap 81 extending over the top of the two springs 76 and 77. The upper end of the rod, which is threaded, is provided with a metal washer 82 and nut 83, the washer 82 being spaced from the cap 81 by a resilient washer 84 seated in a depression in the cap 81. The lower end of the rod 80 which is likewise threaded is provided with a special nut 85 formed with an arcuate top face adapted to seat against the pin 79. As the trailing arms 61 and 67 are urged to pivot upwardly, the forwardly projecting arms 78 are pivoted downwardly thus drawing downwardly on the rod 80 to compress the springs 76 and 77 against the web on which they are seated.

The upper pair of trailing arms 61 and the lower pair of trailing arms 67 are both provided with sway stabilizing means in the embodiment illustrated although in some instances it is only necessary to provide such means at top or bottom. As illustrated in Figures 2 and 4, a torsion bar 90 extends through each of the tubular members 51 from side to side and projects at each end for connection to a plate 91 secured to the respective trailing arm 61 or 67 by bolts 92. The plate is formed with a sleeve 93 which is internally splined and an enlarged portion of each torsion bar at each end thereof is splined to cooperate accordingly with the sleeve 93. A cap 95 secured to the sleeve 93 covers the end of each torsion bar 90. It is to be noted that the torsion bars according to the present invention are not secured to the frame at any point but are rigidly secured at each end to opposite trailing arms of each pair so that movement of a wheel at one side tends to cause corresponding movement of the opposite wheel.

Each upper arm 61 is provided with a projection 96 adapted to engage a bumper stop secured to the frame of the vehicle. Shock absorbers are mounted near the rear or trailing end of each upper arm 61, the connection being omitted in the drawings for the sake of clarity.

The result is a combination of front end drive and independent wheel suspension constituting a kit which may be adapted to a vehicle of the kind described without moving the engine or radiator and without sacrificing ground clearance but with a very marked improvement in ride characteristics whereby shocks which the vehicle, without the conversion, could not stand, are not transmitted to it in full force. Thus there is provided a kit which makes it possible for a vehicle of the kind described to be quickly modified for off the road use and it moreover enables the ride characteristics and performance of the conventional vehicle of the type described to be markedly improved with resulting increase in the life of the vehicle and decrease in driver fatigue.

The embodiments of the invention in which an exclusive property or privilege is claimed are defined as follows:

1. In a vehicle of the type described, independent front wheel suspension mechanism comprising, two vertically spaced substantially parallel reinforcing members extending transversely of the vehicle ahead of the vehicle engine, a pair of king pin and wheel bearing stub axle assemblies adapted each for mounting a front wheel, a pair of arms pivotally mounted at each side of the vehicle frame one on each frame reinforcing member, a strut connected to the lower of said arms at each side of the vehicle frame adjacent to the trailing end thereof and having the other end of the strut pivotally mounted on the lower reinforcing member at a point spaced inwardly of said lower arm, means at the free end of each arm mounting one of said king pin and wheel bearing stub axle assemblies between the arms at each side of the vehicle, a plurality of trusses interconnecting said frame reinforcing members, each of at least two of said trusses comprising means connecting the truss to a longitudinal frame member of the vehicle, coil spring means, at least one truss at each side of the vehicle comprising means forming a seat for at least one of said coil spring means, the strut connected to each lower arm having means coacting with one of said coil spring means whereby upward swinging movement of the trailing end of each pair of said arms is resisted by said coil spring means, at least one of said reinforcing members being tubular and torsion resisting means housed in said tubular reinforcing member for free rotational movement in relation thereto, said torsion resisting means being connected to a pair of said arms to transmit swinging movement of the associated arm to the corresponding arm at the opposite side of the vehicle.

2. Independent front wheel suspension mechanism as claimed in claim 1 in which said means coacting with one of said coil spring means comprises a forked member projecting from the strut ahead of the lower frame reinforcing member, a rod secured to said fork and means connecting said rod with one end of one of said coil spring means to compress said coil spring on its seat on upward swinging movement of the lower arm.

References Cited in the file of this patent

UNITED STATES PATENTS

| | | |
|---|---|---|
| 2,007,952 | Armstrong | July 16, 1935 |
| 2,024,099 | Hofweber et al. | Dec. 10, 1935 |
| 2,044,809 | Rabe | June 23, 1936 |
| 2,117,589 | Armstrong | May 17, 1938 |
| 2,164,602 | Valletta | July 4, 1939 |
| 2,166,774 | Tjaarda | July 18, 1939 |
| 2,233,145 | Schimek | Feb. 25, 1941 |
| 2,439,659 | Julien | Apr. 13, 1948 |
| 2,469,244 | Rowland et al. | May 3, 1949 |
| 2,483,974 | Hicks et al. | Oct. 4, 1949 |
| 2,533,950 | McCormick | Dec. 12, 1950 |

FOREIGN PATENTS

| | | |
|---|---|---|
| 969,772 | France | May 31, 1950 |